United States Patent
Bohler

[11] 3,751,094
[45] Aug. 7, 1973

[54] SLIDEABLY ADJUSTABLE AUXILIARY LIFT HANDLE

[76] Inventor: Gerard M. Bohler, R.D. 2, Pine Grove, Pa. 17963

[22] Filed: Aug. 10, 1971

[21] Appl. No.: 170,519

[52] U.S. Cl............ 294/58, 37/53, 294/54, 16/115, 30/260
[51] Int. Cl............ A01b 1/22, B25g 1/04
[58] Field of Search................ 37/53; 294/57–59, 54; 30/260; 16/115

[56] References Cited
UNITED STATES PATENTS

| | | | |
|---|---|---|---|
| 758,482 | 4/1904 | Smith | 294/58 X |
| 2,653,406 | 9/1953 | Grabiak et al. | 294/58 X |
| 2,520,606 | 8/1950 | McLoughlin | 37/53 X |

FOREIGN PATENTS OR APPLICATIONS

| | | | |
|---|---|---|---|
| 52,045 | 8/1936 | Denmark | 294/58 |
| 547,714 | 5/1956 | Belgium | 294/58 |

Primary Examiner—Robert E. Pulfrey
Assistant Examiner—Eugene H. Eickholt
Attorney—Francis C. Browe, Richard G. Kline et al.

[57] ABSTRACT

An auxilliary handle which is readily securable to a regular handle of an implement such as a shovel, rake or hoe, the device consisting of an angularly shaped member that is secured at its opposite ends to the regular handle, and the center angular portion of the auxilliary handle extending upwardly so that it may be grasped by a person's one hand while the other hand grasps the regular handle.

3 Claims, 3 Drawing Figures

PATENTED AUG 7 1973
3,751,094
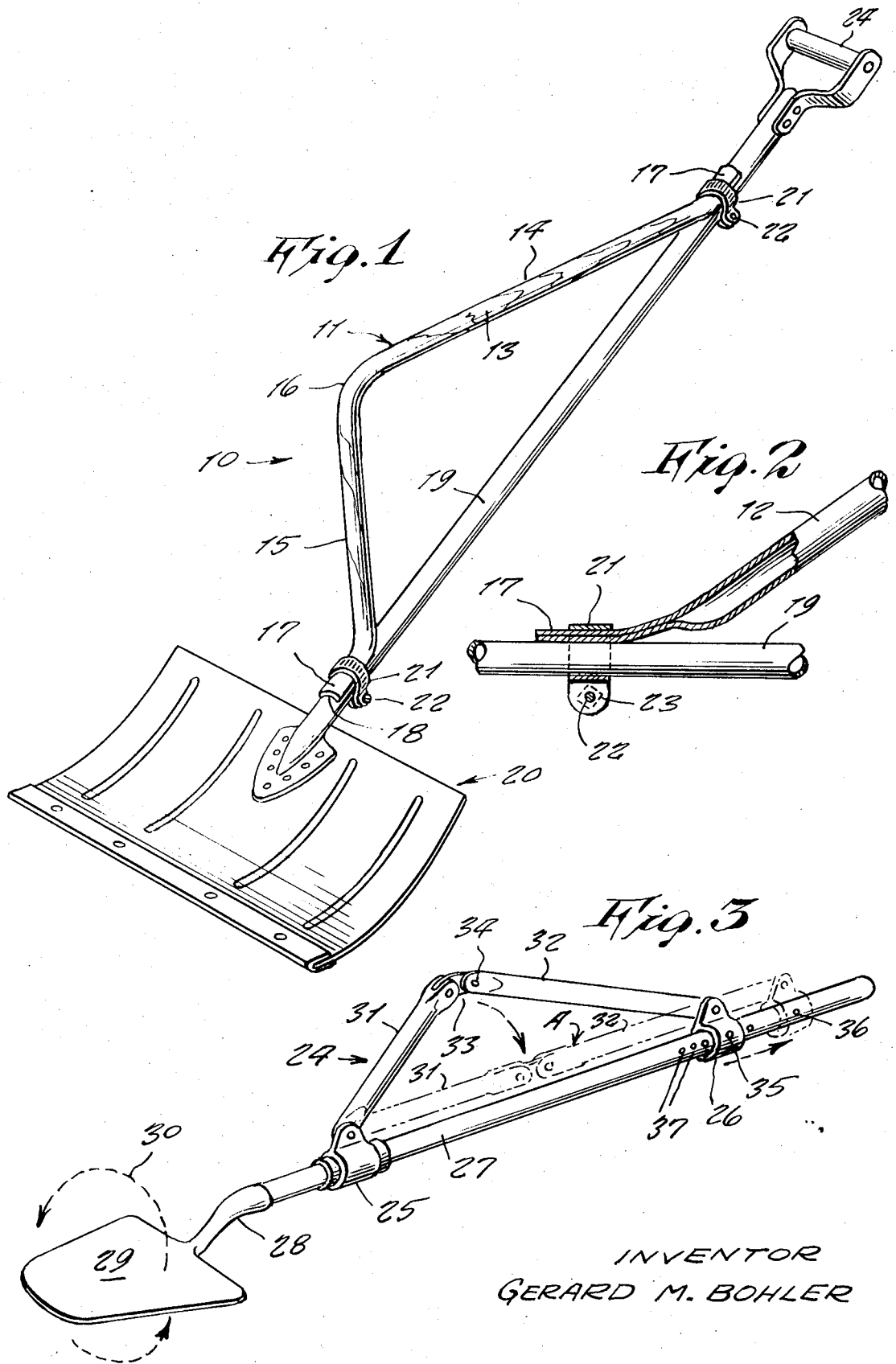
INVENTOR
GERARD M. BOHLER

SLIDEABLY ADJUSTABLE AUXILIARY LIFT HANDLE

This invention relates generally to implement handles. More specifically the present invention relates to handles which are attached to manually operated tools such as shovels, pitch forks, rakes and the like.

It is generally well known that the handling of an implement like a shovel can be a tiring task due to the necessity of a person bending over and in such inclined position being required to lift a load by the implemenet. This situation is, of course objectionable and in want of improvement.

Accordingly it is the principal object of the present invention to provide a pleasure lift handle which is readily attachable as an auxilliary handle to a regular handle of an implement, the pleasure lift handle having means to eliminate the necessity of a worker to bend over as far particularly when lifting a load upon the implement.

Another object of the present invention is to provide an auxilliary handle which will enable a user to lift a greater weight of load with less effort due to the user being able to remain more erect so that his body forms a stronger fulcrum of a lever of the implement handle.

Yet another object of the present invention is to provide an auxilliary handle which is securable to a manually operated implement and which has the property of natural stability to hang as a plumb bob.

Yet another object of the present invention is to provide an auxilliary handle which is more comfortable to use.

Still a further object of the present invention is to provide an auxilliary handle which has the characteristics of having none of the tendencies to tip and spill a load from the implement such as sometimes occurs with a conventional handled implement.

Still a further object of the present invention is to provide an auxilliary handle which does not need replacement of existing handles upon implements, but which is readily attachable thereto.

Still a further object of the present invention is to provide an auxilliary handle which is readily detachable from an implement so that it can be used on other implements, thus not requiring the purchase of a large number of auxilliary handles for several different tools.

Other objects of the present invention are to provide an auxilliary handle which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention shown mounted upon a snow shovel, FIG. 2 is an enlarged framentary side elevation view thereof shown partly in cross section, and FIG. 3 is a perspective view of a modified design of the present invention and which incorporates means so that implement can be more easily rotated for dumping a load without excessive wrist stress, and wherein the auxilliary handle can be readily straightened out for conveniently storing the implement within a minimum amount of space.

Referring now to the drawing in detail, and more particularly at this time to FIGS. 1 and 2 thereof, the reference numeral 10 represents a pleasure lift handle according to the present invention wherein there is a bar 11 that is formed wither from tubular metal 12 such as shown in FIG. 2 of the drawing, or which may be formed of wood 13, as is shown in FIG. 1.

The bar 11 is of generally angle configuration and having a straight, relatively longer leg 14 and a straight, relatively shorter leg 15 with an obtuse bend 16 formed there between.

The rod 11 is of generally circular, cross-sectional configuration so as to be convenient when grasped within the hand of a person.

At each opposite end of the bar 11 there is a terminal portion 17 that is concaved upon one side 18 so as to conform to the contour of the conventional handle 19 of the implement 20.

It is to be noted that the terminal portions 17 are bent relative to their adjacent legs so as to be in linear alignment with each other and thus rest snuggily against the cylindrical side of the handle 19 of the implement.

It is to be noted that if the auxilliary handle is made of tubular metal, then the entire above described device may be comprised of a single part which is bent up to the shape above described. However, if the auxilliary handle is made of wood, then it may be necessary that the terminal portion 17 be made of separate parts which are affixed to the ends of the legs 14 and 15 of the wooden handle.

A take-up clamp 21 of conventional type is attached around each of the terminal portions 17 and around the handle 19 for attachment of auxilliary handle to the implement. A screw 22 and a nut 23 can serve to draw up the two ends of the take-up clamp together as to tightly secure the clamp attachment.

In operative use, a person may conveniently grasp with one hand the handle member 24 at the end of the implement and with his other hand grasp the auxilliary handle rod 11 and thus use the implement in a conventional manner.

It would be readily evident that the implement would thus hang in the manner of a pendulum and would be less likely to spill over than would be possible by using the normal handle 19 alone. Thus there has been indicated an improved pleasure lift handle.

Referring now to FIG. 3 of the drawing, there is shown a modified design of the present invention which additionally incorporates further features for convenience of the tool.

The auxilliary handle 24 shown in FIG. 3 incorporates a sleeve 25 and 26 at each opposite end thereof, the sleeves having the regular handle 27 of the implement inserted therethrough.

In this form of the invention, when a person intends to dump the load from the shovel blade 29 as indicated, he simply rotates the handle 27 within the sleeves 25 and 26 so that the shovel blade 29 simply pivots as indicated by the arrow 30. This effort required is less upon a person's wrist than would be required for both wrist and arms to accomplish such as with a conventional implement. Thus energy is conserved for the person.

Additionally the auxilliary handle 24 instead of being made of one bar member as above described, is now made of separate straight bars 31 and 32 which are attached pivotly together at the bend 33 by means of one or two pivot pins 34 so that the auxilliary handle can assume the position as shown in FIG. 3 or wherein the handle 24 can be straightened out to assume the straight position as shown by the phantom lines indicated at A.

In the straightened out position the auxilliary handle thus takes up less space so that the implement can be stored away within a minimum amount of space within a workshop or shed.

In order for the auxilliary handle to straighten out, the sleeve 26 is slideable along the regular handle 27 and secured by means of a pin 35 to an opening 36 in the regular handle 27.

It should additionally be noted that in this form of the invention, the angular angle of the auxilliary handle can be selectively made greater or less by means of the pin 35 being fitted into any one of the openings 37 provided transversely through the regular handle 27. Thus additional features of advantage are provided.

What I now claim is:

1. In an auxilliary handle for a hand operated implement, the combination of an implement and a removable, auxilliary attachable handle member, said auxilliary handle member being securable at its opposite ends to a handle of said implement, said auxilliary handle member comprising a rod, said rod incorporating angle means so as to be conveniently grasped within a person's one hand while his other hand holds the first said handle forming the regular handle of said implement, said auxilliary handle including rotatable sleeves at opposite ends thereof for freely rotating about said regular handle, and wherein one said sleeve is longitudinally fixed between collars on said regular handle while the other sleeve is longitudinally slidable thereon.

2. The combination as set forth in claim 1 wherein said rod comprising said auxilliary handle member comprises a plurality of pivotally inter connected segmental sections, the opposite ends of said rod being respectively pivotally inter connected to one of said rotatable sleeves.

3. The combination as set forth in claim 2 wherein said auxilliary handle member includes means for securing said sleeve longitudinally slidable on said regular handle to said regular handle at a given spaced apart position from said sleeve longitudinally fixed between said collars on said regular handle.

* * * * *